United States Patent
Young et al.

(10) Patent No.: US 10,711,133 B2
(45) Date of Patent: Jul. 14, 2020

(54) FLAME RETARDANT COPOLYESTER COMPOSITIONS

(71) Applicant: Eastman Chemical Company, Kingsport, TN (US)

(72) Inventors: Robert Erik Young, Kingsport, TN (US); Kendrick Casey Halsey, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 104 days.

(21) Appl. No.: 14/962,252

(22) Filed: Dec. 8, 2015

(65) Prior Publication Data

US 2016/0168374 A1    Jun. 16, 2016

Related U.S. Application Data

(60) Provisional application No. 62/090,964, filed on Dec. 12, 2014.

(51) Int. Cl.
| | | |
|---|---|---|
| *B32B 27/36* | (2006.01) | |
| *C08L 67/02* | (2006.01) | |
| *C08G 63/183* | (2006.01) | |
| *C08J 5/18* | (2006.01) | |
| *C08K 5/5333* | (2006.01) | |

(52) U.S. Cl.
CPC ............ *C08L 67/02* (2013.01); *C08G 63/183* (2013.01); *C08J 5/18* (2013.01); *C08K 5/5333* (2013.01); *C08J 2367/02* (2013.01); *C08J 2385/02* (2013.01)

(58) Field of Classification Search
CPC .. C08G 63/183; C08J 2367/02; C08K 5/5333; C08L 67/02
See application file for complete search history.

(56) References Cited

U.S. PATENT DOCUMENTS

| | | | |
|---|---|---|---|
| 3,772,405 A | 11/1973 | Hamb | |
| 4,046,724 A * | 9/1977 | Kato ...................... | C08G 79/04 524/13 |
| 5,654,347 A | 8/1997 | Khemani et al. | |
| 5,696,176 A | 12/1997 | Khemani et al. | |
| 2012/0065304 A1* | 3/2012 | Young .................. | C08K 5/0066 524/101 |

FOREIGN PATENT DOCUMENTS

WO    WO 2012/031171 A1    3/2012

OTHER PUBLICATIONS

ASTM International Designation: D256, "Standard Test Methods for Determining the Izod Pendulum Impact Resistance of Plastics"; Jun. 2010.
ASTM International Designation: D638, "Standard Test Method for Tensile Properties of Plastics"; Mar. 2015.
ASTM International Designation: D648, "Standard Test Method for Deflection Temperature of Plastics Under Flexural Load in the Edgewise Position"; Mar. 2007.
ASTM International Designation: D1003, "Standard Test Method for Haze and Luminous Transmittance of Transparent Plastics"; Nov. 2013.
ASTM International Designation: D3763, "Standard Test Method for High Speed Puncture Properties of Plastics Using Load and Displacement Sensors"; Sep. 2015.
ASTM International Designation: E84, "Standard Test Method for Surface Burning Characteristics of Building Materials"; Jan. 2016.
Walters, Richard N. and Lyon, Richard E.; "Molar Group Contributions to Polymer Flammability"; Journal of Applied Polymer Science, vol. 87, Issue 3; pp. 548-563; 2003.
Chen, Li and Wang, Yu-Zhong; "Aryl Polyphosphonates: Useful Halogen-Free Flame Retardants for Polymers"; Materials, vol. 3; Oct. 2010; pp. 4746-4760.
Wang, Yu-Zhong; Solubility Parameters of Poly(sulfonyldiphenylene phenylphosphonates) and Its Miscibility with Poly(ethylene terephthalate); Journal of Polymer Science: Part B: Polymer Physics, vol. 41; Oct. 2003; pp. 2296-2301.
Notification of Transmittal of the International Search Report and the Written Opinion of the International Searching Authority, or the Declaration dated Mar. 9, 2016 received in corresponding International Application No. PCT/US2015/065196.

\* cited by examiner

*Primary Examiner* — Prashant J Khatri
*Assistant Examiner* — Zachary M Davis
(74) *Attorney, Agent, or Firm* — Tammye L. Taylor

(57) ABSTRACT

The present invention relates to the combination of halogen-free flame retardant additives in a copolyester to improve the flame retardant properties of the copolyester composition while retaining clarity and impact properties, methods of making the copolyester composition and articles made from the copolyester composition. More specifically, the present invention relates to the use of a polymeric sulfonyl and phosphonate containing flame retardant compound in copolyester compositions to improve the flame retardant properties while retaining clarity, glass transition temperature, impact properties, methods of making said copolyester compositions and articles therefrom.

24 Claims, No Drawings

FLAME RETARDANT COPOLYESTER COMPOSITIONS

CROSS REFERENCE TO RELATED APPLICATION

This application claims priority to U.S. Provisional Application No. 62/090,964 filed Dec. 12, 2014, the disclosure of which is incorporated herein by reference in its entirety.

BACKGROUND OF THE INVENTION

Field of the Invention

The present invention relates to the use of a combination of halogen-free flame retardant additives in a copolyester to improve the flame retardant properties of the copolyester composition while retaining impact properties. More specifically, the present invention relates to the use of a polymeric sulfur and phosphorous containing flame retardant in copolyesters to improve the flame retardant properties while retaining impact, glass transition temperature, and clarity properties.

Background

Flame retardant materials are added to some polymers to improve flame resistance, particularly to meet specific fire standards such as UL94 V-0. However, the addition of flame retardant materials in amount sufficient to meet the fire standards may have a deleterious effect on impact resistance, glass transition temperature, and clarity of the copolyester film or sheet containing an effective amount of the flame retardant materials.

Copolyesters can be flame retarded in a variety of means but these methods have some drawbacks. Halogen compounds such as Declorane Plus, decabromodiphenyl oxide or decabromodiphenyl ether can be effective flame retardants, but are objectionable in the marketplace due to fears of smoke toxicity during combustion, the formation of dioxin-type compounds during combustion or bio-accumulation. Liquid phosphorous compounds such as triphenyl phosphite or triphenyl phosphate can flame retard copolyesters but at effective use levels, they plasticize and soften the copolyester thus reducing heat resistance to distortion. Solid flame retardants in the melamine and phosphorous classes can be used individually as well, but in the past, the concentrations needed to achieve flame retardancy have made the copolyester brittle or reduced tensile strength properties. Plastics used in many applications such as lighting diffusers, light emitting diode (LED) light fixtures, electronics applications, wall protection products and housings for handheld and stationary appliances all have flammability requirements specified in various codes or standards. These applications also have durability or physical property requirements in addition to flammability requirements. Additionally, some building and construction and appliance applications have banned the use of halogen containing compounds. Consequently, there is a need for copolyesters used in these applications that retain physical properties, are clear and use non-halogen flame retardants.

There exists a need for an improved copolyester composition comprising non-halogen flame retardants and film or sheets which exhibit good flame resistance, good clarity and impact resistance.

BRIEF SUMMARY OF THE INVENTION

Applicants have unexpectedly discovered an improved copolyester composition comprising an effective amount of non-halogen flame retardants useful for making articles such as films, sheets, or profiles which exhibit good flame resistance and good clarity while maintaining glass transition temperature and impact resistance.

In one aspect the present invention comprises a copolyester composition comprising:
(a) from greater than 90 to about 98 wt % of the copolyester, the copolyester comprising:
  a diacid component comprising
    from 70 to 100 mole % residues of terephthalic acid,
    from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    from 1 to 65 mole % cyclohexanedimethanol residues and
    from 35 to 99 mole % of a modifying glycol having 2 to 20 carbon atoms;
(b) from about 2 to about 10 wt % of a flame retardant comprising a polymer comprising a sulfonyl moiety and a phenyl phosphonate moiety,
  wherein the copolyester composition has a UL 94 V-0 rating,
  wherein the energy at maximum load is greater than about 15 Joules measured on a 100 mm×100 mm×1.5 mm plaque according to ASTM D3763;
  wherein the copolyester composition has about less than 10% haze according to ASTM D1003,
  wherein the wt % is based on the weight of the copolyester, wherein the total mole % of the dicarboxylic acid component is 100 mole % and the total mole % of the glycol component is 100 mole %.

In one aspect the present invention comprises a copolyester composition comprising:
(a) from greater than 90 to about 98 wt % of the copolyester, the copolyester comprising:
  (i) a diacid component comprising
    from 70 to 100 mole % residues of terephthalic acid,
    from 0 to 30 mole % residues of a modifying aromatic diacid having
    from 8 to 12 carbon atoms, and
    from 0 to 10 mole % residues of an aliphatic dicarboxylic acid; and
  (ii) a glycol component comprising
    from 1 to 65 mole % cyclohexanedimethanol residues and
    from 35 to 99 mole % of a modifying glycol having 2 to 20 carbon atoms;
(b) from about 2 to about 10 wt % of a flame retardant comprising a polymer comprising a sulfonyl moiety and a phenyl phosphonate moiety,
  wherein the copolyester composition has a UL 94 V-0 rating,
  wherein the energy at maximum load is greater than about 23 Joules measured on a 100 mm×100 mm×1.5 mm plaque according to ASTM D3763;
  wherein the copolyester composition has about less than 10% haze according to ASTM D1003,
  wherein the wt % is based on the weight of the copolyester, wherein the total mole % of the dicarboxylic acid component is 100 mole % and the total mole % of the glycol component is 100 mole %.

In one aspect the present invention comprises an article comprising, a copolyester composition comprising:
(a) from greater than 90 to about 98 wt % of the copolyester, the copolyester comprising:

(i) a diacid component comprising
    from 70 to 100 mole % residues of terephthalic acid,
    from 0 to 30 mole % residues of a modifying aromatic diacid having
        from 8 to 12 carbon atoms, and
    from 0 to 10 mole % residues of an aliphatic dicarboxylic acid; and
(ii) a glycol component comprising
    from 1 to 65 mole % cyclohexanedimethanol residues and
    from 35 to 99 mole % of a modifying glycol having 2 to 20 carbon atoms;
(b) from about 2 to about 10 wt % of a flame retardant comprising a polymer comprising a sulfonyl moiety and a phenyl phosphonate moiety,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the weight % is based on the weight of the copolyester, wherein the total mole % of the dicarboxylic acid component is 100 mole % and the total mole % of the glycol component is 100 mole %.

In another aspect the present invention comprises a method of making a copolyester composition, the method comprising blending
(a) from greater than 90 to about 98 wt % of the copolyester, the copolyester comprising:
    (i) a diacid component comprising
        from 70 to 100 mole % residues of terephthalic acid,
        from 0 to 30 mole % residues of a modifying aromatic diacid having
            from 8 to 12 carbon atoms, and
        from 0 to 10 mole % residues of an aliphatic dicarboxylic acid; and
    (ii) a glycol component comprising
        from 1 to 65 mole % cyclohexanedimethanol residues and
        from 35 to 99 mole % of a modifying glycol having 2 to 20 carbon atoms;
(b) from about 2 to about 10 wt % of a flame retardant comprising a polymer comprising a sulfonyl moiety and a phenyl phosphonate moiety,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the weight % is based on the weight of the copolyester, wherein the total mole % of the dicarboxylic acid component is 100 mole % and the total mole % of the glycol component is 100 mole %.

In one aspect the present invention comprises a copolyester composition comprising:
(a) from greater than 90 to about 98 wt % of the copolyester, the copolyester comprising:
    (i) a diacid component comprising
        from 70 to 100 mole % residues of terephthalic acid,
        from 0 to 30 mole % residues of a modifying aromatic diacid having
            from 8 to 12 carbon atoms, and
        from 0 to 10 mole % residues of an aliphatic dicarboxylic acid; and
    (ii) a glycol component comprising
        from 1 to 65 mole % cyclohexanedimethanol residues and
        from 35 to 99 mole % of a modifying glycol having 2 to 20 carbon atoms;
(b) from about 2 to about 10 wt % of a flame retardant comprising a polymer comprising polysulfonyldiphenylene phenyl phosphonate,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the weight % is based on the weight of the copolyester, wherein the total mole % of the dicarboxylic acid component is 100 mole % and the total mole % of the glycol component is 100 mole %.

In one aspect the present invention comprises an article comprising, a copolyester composition comprising:
(a) from greater than 90 to about 98 wt % of the copolyester, the copolyester comprising:
    (i) a diacid component comprising
        from 70 to 100 mole % residues of terephthalic acid,
        from 0 to 30 mole % residues of a modifying aromatic diacid having from 8 to 12 carbon atoms, and
        from 0 to 10 mole % residues of an aliphatic dicarboxylic acid; and
    (ii) a glycol component comprising
        from 1 to 65 mole % cyclohexanedimethanol residues and
        from 35 to 99 mole % of a modifying glycol having 2 to 20 carbon atoms;
(b) from about 2 to about 10 wt % of a flame retardant comprising a polymer comprising polysulfonyldiphenylene phenyl phosphonate,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the wt % is based on the weight of the copolyester, wherein the total mole % of the dicarboxylic acid component is 100 mole % and the total mole % of the glycol component is 100 mole %.

In another aspect the present invention comprises a film comprising a copolyester composition comprising:
(a) from greater than about 90 to about 98 wt % of the copolyester comprising
    (i) a diacid component comprising
        from 70 to 100 mole % residues of terephthalic acid,
        from 0 to 30 mole % residues of a modifying aromatic diacid having from 8 to 12 carbon atoms, and
        from 0 to 10 mole % residues of an aliphatic dicarboxylic acid; and
    (ii) a glycol component comprising
        from 1 to 65 mole % cyclohexanedimethanol residues and
        from 35 to 99 mole % of a modifying glycol having 2 to 20 carbon atoms;
(b) from about 4 to about 10 wt % of a flame retardant comprising a polymer comprising a sulfonyl moiety and a phenyl phosphonate moiety, wherein the film has a thickness of 1-10 mils and has a VTM-0 or VTM-2 rating wherein the film has less than about 10% haze according to ASTM D1003, wherein the wt % is based on the weight of the copolyester, wherein the total mole % of the dicarboxylic acid component is 100 mole % and the total mole % of the glycol component is 100 mole %.

In another aspect the present invention comprises a method of making a copolyester composition, the method comprising blending
(a) from greater than 90 to about 98 wt % of the copolyester, the copolyester comprising:
  (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
  (ii) a glycol component comprising
  from 1 to 65 mole % cyclohexanedimethanol residues and
  from 35 to 99 mole % of a modifying glycol having 2 to 20 carbon atoms;
(b) from about 2 to about 10 wt % of a flame retardant comprising a polymer comprising polysulfonyldiphenylene phenyl phosphonate,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the wt % is based on the weight of the copolyester, wherein the total mole % of the dicarboxylic acid component is 100 mole % and the total mole % of the glycol component is 100 mole %.

In one aspect, the copolyester comprises a diacid component comprising 100 mole % terephthalic acid, and a glycol component comprising 31 mole % 1,4-cyclohexanedimethanol and 69 mole % ethylene glycol wherein the total mole % of the dicarboxylic acid component is 100 mole %, the total mole % of the glycol component is 100 mole %.

In one aspect, the copolyester comprises a diacid component comprising 100 mole % terephthalic acid, and a glycol component comprising 3.5 mole % 1,4-cyclohexanedimethanol and 96.5 mole % ethylene glycol wherein the total mole % of the dicarboxylic acid component is 100 mole %, the total mole % of the glycol component is 100 mole %.

In one aspect, the copolyester comprises a diacid component comprising 100 mole % terephthalic acid, and a glycol component comprising 12 mole % 1,4-cyclohexanedimethanol and 88 mole % ethylene glycol wherein the total mole % of the dicarboxylic acid component is 100 mole %, the total mole % of the glycol component is 100 mole %.

In one aspect, the copolyester comprises a diacid component comprising 100 mole % terephthalic acid, and a glycol component comprising 20 mole % 1,4-cyclohexanedimethanol and 80 mole % ethylene glycol and 0.1 mole % trimellitic anhydride wherein the total mole % of the dicarboxylic acid component is 100 mole %, the total mole % of the glycol component is 100 mole %.

In one aspect, the copolyester comprises a diacid component comprising 100 mole % terephthalic acid, and a glycol component comprising 50 mole % 1,4-cyclohexanedimethanol and 50 mole % ethylene glycol wherein the total mole % of the dicarboxylic acid component is 100 mole %, the total mole % of the glycol component is 100 mole %.

In one aspect, the copolyester comprises a diacid component comprising 100 mole % terephthalic acid, and a glycol component comprising 62.5 mole % 1,4-cyclohexanedimethanol and 37.5 mole % ethylene glycol wherein the total mole % of the dicarboxylic acid component is 100 mole %, the total mole % of the glycol component is 100 mole %.

In one aspect the invention comprises a copolyester composition concentrate comprising the copolyester and a flame retardant comprising a polymer comprising a sulfonyl moiety and a phenyl phosphonate moiety, wherein the concentrate comprises greater than 15 wt % of the flame retardant based on the total weight of the concentrate.

In one aspect the invention comprises an article comprising any of the copolyester compositions described above.

In one aspect the invention comprises an article comprising any of the copolyester compositions described above wherein the article is produced by extrusion, injection molding or calendaring.

In one aspect the invention comprises a film, sheet or profile comprising any of the copolyester compositions described above.

DETAILED DESCRIPTION

The present invention may be understood more readily by reference to the following detailed description of certain embodiments of the invention and the working examples.

In accordance with the purpose(s) of this invention, certain embodiments of the invention are described in the Summary of the Invention and are further described herein below. Also, other embodiments of the invention are described herein.

The present invention provides a copolyester composition comprising a copolyester and a polymeric flame retardant having both a sulfonyl moiety and a phenyl phosphonate moiety in which the copolyester composition exhibits good flame retardancy, clarity and good puncture resistance, articles made therefrom, and methods of making the composition and articles. The present invention involves the use of a halogen-free flame retardant additive to improve the flame retardant properties while retaining impact and clarity properties. The flame retardant additive is a sulfur and phosphorous-containing polymeric compound. When the flame retardant is added at the appropriate concentration with a copolyester, a flame retarded composition which retains ductile instrumented impact properties (ASTM D3763) while achieving a UL94 V-0 rating and good clarity with low haze according to ASTM D1003.

In one aspect the present invention comprises a copolyester composition comprising:
(a) from greater than 90 to about 98 wt % of the copolyester, the copolyester comprising:
  (i) a diacid component comprising
  from 70 to 100 mole % residues of terephthalic acid,
  from 0 to 30 mole % residues of a modifying aromatic diacid having from 8 to 12 carbon atoms, and
  from 0 to 10 mole % residues of an aliphatic dicarboxylic acid; and
  (ii) a glycol component comprising
  from 1 to 65 mole % cyclohexanedimethanol residues and
  from 35 to 99 mole % of a modifying glycol having 2 to 20 carbon atoms;

(b) from about 2 to about 10 wt % of a flame retardant comprising a polymer consisting essentially of polysulfonyldiphenylene phenyl phosphonate,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the wt % is based on the weight of the copolyester, wherein the total mole % of the dicarboxylic acid component is 100 mole % and the total mole % of the glycol component is 100 mole %.

In one aspect the present invention comprises an article comprising, a copolyester composition comprising:
(a) from greater than 90 to about 98 wt % of the copolyester, the copolyester comprising:
  (i) a diacid component comprising
    from 70 to 100 mole % residues of terephthalic acid,
    from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    from 1 to 65 mole % cyclohexanedimethanol residues and
    from 35 to 99 mole % of a modifying glycol having 2 to 20 carbon atoms;
(b) from about 2 to about 10 wt % of a flame retardant comprising a polymer consisting essentially of polysulfonyldiphenylene phenyl phosphonate,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the wt % is based on the weight of the copolyester, wherein the total mole % of the dicarboxylic acid component is 100 mole % and the total mole % of the glycol component is 100 mole %.

In another aspect the present invention comprises a method of making a copolyester composition, the method comprising blending
(a) from greater than 90 to about 98 wt % of the copolyester, the copolyester comprising:
  (i) a diacid component comprising
    from 70 to 100 mole % residues of terephthalic acid,
    from 0 to 30 mole % residues of a modifying aromatic diacid having from 8 to 12 carbon atoms, and
    from 0 to 10 mole % residues of an aliphatic dicarboxylic acid; and
  (ii) a glycol component comprising
    from 1 to 65 mole % cyclohexanedimethanol residues and
    from 35 to 99 mole % of a modifying glycol having 2 to 20 carbon atoms;
(b) from about 2 to about 10 wt % of a flame retardant comprising a polymer consisting essentially of polysulfonyldiphenylene phenyl phosphonate,
wherein the copolyester composition has a UL 94 V-0 rating,
wherein the energy at maximum load is greater than about 15 Joules measured on a 100 mm×100 mm×1.5 mm plaque according to ASTM D3763;
wherein the copolyester composition has about less than 10% haze according to ASTM D1003,
wherein the wt % is based on the weight of the copolyester, wherein the total mole % of the dicarboxylic acid component is 100 mole % and the total mole % of the glycol component is 100 mole %.

Copolyesters useful in the present invention comprise residues of an aromatic diacid and residues of two or more glycols.

The term "copolyester," as used herein, is intended to include "polyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols. Furthermore, as used in this application, the interchangeable terms "diacid" or "dicarboxylic acid" include multifunctional acids, such as branching agents. The term "glycol" as used in this application includes, but is not limited to, diols, glycols, and/or multifunctional hydroxyl compounds. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue," as used herein, means any organic structure incorporated into a polymer through a polycondensation and/or an esterification reaction from the corresponding monomer. The term "repeating unit," as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester. The term "modifying aromatic diacid" means an aromatic dicarboxylic acid other the terephthalic acid. The term "modifying glycol" means a glycol other than 1,4-cyclohexane dimethanol.

In one embodiment, terephthalic acid may be used as the starting material. In another embodiment, dimethyl terephthalate may be used as the starting material. In another embodiment, mixtures of terephthalic acid and dimethyl terephthalate may be used as the starting material and/or as an intermediate material.

The copolyesters used in the present invention typically can be prepared from dicarboxylic acids and diols which react in substantially equal proportions and are incorporated into the copolyester polymer as their corresponding residues. The copolyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a copolyester containing 30 mole % isophthalic acid, based on the total acid residues, means the copolyester contains 30 mole % isophthalic acid residues out of a total of 100 mole % acid residues. Thus, there are 30 moles of isophthalic acid residues among every 100 moles of acid residues. In another example, a copolyester containing 30 mole % 1,4-cyclohexanedimethanol, based on the total diol residues, means the copolyester contains 30 mole % 1,4-cyclohexanedimethanol residues out of a total of 100 mole % diol residues. Thus, there are 30 moles of 1,4-cyclohexanedimethanol residues among every 100 moles of diol residues.

The copolyesters comprise 70 to 100 mole % of an aromatic diacid. In one embodiment, the copolyesters comprise 70 to 100 mole % of terephthalic acid (TPA). Alternatively, the copolyesters comprise 80 to 100 mole % TPA, or 90 to 100 mole % TPA or 95 to 100 mole % TPA or 100 mole % TPA. For the purposes of this disclosure, the terms "terephthalic acid" and "dimethyl terephthalate" are used interchangeably herein.

In addition to terephthalic acid, the dicarboxylic acid component of the copolyester useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, 0.01 to 20 mole %, from 0.01 to 10 mole %, from 0.01 to 5 mole % and from 0.01 to 1 mole. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the copolyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

The copolyesters useful in the copolyesters compositions of the invention can comprise from 0 to 10 mole %, for example, from 0.01 to 5 mole %, from 0.01 to 1 mole %, from 0.05 to 5 mole %, from 0.05 to 1 mole %, or from 0.1 to 0.7 mole %, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The copolyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole % of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

All of the following embodiments of copolyesters are useful in all of the embodiments of the present invention. In certain embodiments the glycol component of the copolyester comprises ethylene glycol and 1,4-cyclohexanedimethanol. In one embodiment the glycol component of the copolyester comprises 1 to 65 mole % 1,4-cyclohexanedimethanol and 35 to 99 mole % ethylene glycol. In one embodiment the glycol component of the copolyester comprises 1 to 50 mole % 1,4-cyclohexanedimethanol and 50 to 99 mole % ethylene glycol. In one embodiment the glycol component of the copolyester comprises about 1 to 31 mole % 1,4-cyclohexanedimethanol and about 69 to 99 mole % ethylene glycol. In one embodiment the glycol component of the copolyester comprises about 31 mole % 1,4-cyclohexanedimethanol and about 69 mole % ethylene glycol. In one embodiment the glycol component of the copolyester comprises about 5 to 65 mole % 1,4-cyclohexanedimethanol and about 35 to 95 mole % ethylene glycol. In one embodiment the glycol component of the copolyester comprises about 5 to 50 mole % 1,4-cyclohexanedimethanol and about 50 to 95 mole % ethylene glycol. In one embodiment the glycol component of the copolyester comprises about 10 to 65 mole % 1,4-cyclohexanedimethanol and about 35 to 90 mole % ethylene glycol. In one embodiment the glycol component of the copolyester comprises about 10 to 50 mole % 1,4-cyclohexanedimethanol and about 50 to 90 mole % ethylene glycol. In one embodiment the glycol component of the copolyester comprises about 20 to 65 mole % 1,4-cyclohexanedimethanol and about 35 to 80 mole % ethylene glycol. In one embodiment the glycol component of the copolyester comprises about 20 to 50 mole % 1,4-cyclohexanedimethanol and about 50 to 80 mole % ethylene glycol. In one embodiment the glycol component of the copolyester comprises about 30 to 65 mole % 1,4-cyclohexanedimethanol and about 35 to 70 mole % ethylene glycol. In one embodiment the glycol component of the copolyester comprises about 30 to 50 mole % 1,4-cyclohexanedimethanol and about 50 to 70 mole % ethylene glycol.

The 1,4-cyclohexanedimethanol may be cis, trans, or a mixture thereof, for example a cis/trans ratio of 60:40 to 40:60. In another embodiment, the trans-1,4-cyclohexanedimethanol can be present in an amount of 60 to 80 mole %. Alternatively, 1,2- and/or 1-3-cyclohexanedimethanol may be used individually or in combination with each other and/or 1,4-cyclohexanedimethanol.

The glycol component of the copolyester portion of the copolyester composition useful in all of the embodiments of the invention can contain 25 mole % or less of one or more modifying glycols which are not ethylene glycol or 1,4-cyclohexanedimethanol; in one embodiment, the copolyesters useful in the invention may contain less than 15 mole % of one or more modifying glycols. In another embodiment, the copolyesters useful in the invention can contain 10 mole % or less of one or more modifying glycols. In another embodiment, the copolyesters useful in the invention can contain 5 mole % or less of one or more modifying glycols. In another embodiment, the copolyesters useful in the invention can contain 3 mole % or less of one or more modifying glycols. In another embodiment, the copolyesters useful in the invention can contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the copolyesters useful in all embodiments of the invention refer to diols other than ethylene glycol and 1,4-cyclohexanedimethanol and may contain 2 to 16 carbon atoms. Examples of suitable modifying glycols include, but are not limited to, 1,2-propanediol, 1,3-propanediol, neopentyl glycol, 1,4-butanediol, 1,5-pentanediol, 1,6-hexanediol, p-xylene glycol, 2,2,4,4-tetramethylcyclobutane-1,3-diol or mixtures thereof. In another embodiment, the modifying glycols are 1,3-propanediol and/or 1,4-butanediol.

In one aspect, the copolyester compositions of the present invention useful for meeting the UL 94 V-0 rating and energy at maximum load of at least 15 Joules comprise from 2 to 10 wt % of the flame retardant. In one aspect, the copolyester compositions of the present invention useful for meeting the UL 94 V-0 rating and energy at maximum load of at least 23 Joules comprise from 2 to 10 wt % of the flame retardant. In one aspect, the copolyester compositions of the present invention useful for meeting the UL 94 V-0 rating and energy at maximum load of at least 15 Joules comprise from 4 to 10 wt % of the flame retardant. In one aspect, the copolyester compositions of the present invention useful for meeting the UL 94 V-0 rating and energy at maximum load of at least 15 Joules comprise from 2 to 8 wt % of the flame retardant. In one aspect, the copolyester compositions of the present invention useful for meeting the UL 94 V-0 rating and energy at maximum load of at least 23 Joules comprise from 5 to 7 wt % of the flame retardant.

In one aspect, the copolyester compositions of the present invention comprise a copolyester composition comprising any of the copolyesters described above and the polymeric flame retardant having both a sulfonyl moiety and a phenyl phosphonate moiety and has a glass transition temperature (Tg) of from 70 to 90° C. The Tg of the copolyesters useful in the invention, if measured, was determined using a TA DSC 2920 from Thermal Analyst Instrument at a scan rate of 20° C./min. The copolyesters of the present invention can have a Tg of 70° C. to 90° C., 70° C. to 80° C., or 80° C. to 90° C.

In one aspect, the copolyester compositions of the present invention comprise a copolyester composition comprising any of the copolyesters described above and the polymeric flame retardant having both a sulfonyl moiety and a phenyl phosphonate moiety, and are the compositions visually clear. The term "visually clear" is defined herein as a low amount of cloudiness, haziness, and/or muddiness, when inspected visually.

In one embodiment, molded samples of the invention can be measured for optical (light transmission and haze) using ASTM D 1003. In one embodiment, these measurements can be performed on samples having a thickness of ⅛ inch. In another embodiment, these measurements are performed on samples measuring 4 inches×4 inches.

The term "% haze", as used herein, refers to haze values determined according to ASTM Method D1003 using a HunterLab UltraScan Sphere 8000 Colorimeter manufactured by Hunter Associates Laboratory, Inc., Reston, Va. using Hunter's Universal Software (version 3.8) (% Haze=100*Diffuse Transmission/Total Transmission). For the compositions of the invention, haze is determined by molding or casting the composition into a sheet or film having a thickness of ⅛ inch or less and measuring the haze according to D1003 and/or the procedure described in the examples. Again in one embodiment, these measurements can be performed on samples having a thickness of ⅛ inch. In another embodiment, these measurements are performed on samples measuring 4 inches×4 inches.

In one aspect of the invention, each embodiment of the invention can have haze values of from 0 to 10, or 0 to 5, or 1 to 10, or 1 to 5, or 5 to 10 percent as determined by ASTM Method D1003 or by any other method described herein. While these haze values can be present at any percent loading, in one embodiment, the polymer blends of the invention can have a haze value of less than 10% at up to 10% by weight of at least one flame retardant wherein the haze value is determined by ASTM Method D1003 or by other methods described herein and where the weight percentage of the flame retardant is based on the total weight of the copolyester.

In one embodiment of the invention, films having a thickness of less than 10 mils have haze of less than about 10%, according to ASTM D1003, while maintaining a UL-94 VTM-0 or VTM-2 rating.

Certain embodiments of the present invention comprise a copolyester composition comprising any of the copolyesters described above and the polymeric flame retardant having both a sulfonyl moiety and a phenyl phosphonate moiety and from 0.5 to 2.0 wt % of a drip suppressant. Certain embodiments of the present invention comprise a copolyester composition comprising any of the copolyesters described above and the flame retardant polysulfonyldiphenylene phenyl phosphonate and from 0.5 to 2.0 wt % of a drip suppressant. The drip suppressant comprises a fluoropolymer. The fluoropolymer includes, but is not limited to, Teflon™.

The copolyester compositions useful in the invention can possess one or more of the following properties. In one embodiment, the copolyester compositions useful in the invention exhibit, as shown by puncture resistance, a instrumented energy at maximum load of about 15 J at 23° C. with a 100 mm×100 mm×1.5 mm plaque thick bar determined according to ASTM D3763; in one embodiment, the copolyester compositions useful in the invention exhibit a instrumented energy at maximum load of at about 23 J at 23° C. with a 100 mm×100 mm×1.5 mm plaque thick bar determined according to ASTM D3763; the copolyester compositions useful in the invention exhibit a instrumented energy at maximum load of at about 25 J at 23° C. with a 100 mm×100 mm×1.5 mm plaque thick bar determined according to ASTM D3763; in one embodiment, the copolyester compositions useful in the invention exhibit a instrumented energy at maximum load of greater than 33 J at 23° C. with a 100 mm×100 mm×1.5 mm plaque thick bar determined according to ASTM D3763.

Certain embodiments of the present invention comprise an impact modifier to improve impact strength of the copolyester compositions. The impact modifiers comprise plastics and/or elastomers including, but not limited to, Acrylonitrile Butadiene Styrene (ABS), Methyl Methacrylate Butadiene Styrene (MBS), Acrylic (Butyl Acrylate Methyl Acrylate), Copolyester Ether copolymer (COPE, Trade name ECDEL, from Eastman Chemical Company), Ethylene Methacrylate Copolymer (EMAC), Aliphatic Aromatic Copolyester (Trade name EASTAR BIO, from Eastman Chemical Company), and reactive Acrylic (Ethylene Acrylic Ester Glycidyl Methacrylate).

The polyester portion of the copolyester compositions useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a copolyester. See U.S. Pat. No. 3,772,405 for methods of producing copolyesters, the disclosure regarding such methods is hereby incorporated herein by reference.

In another aspect, the invention relates to films or sheets comprising a copolyester produced by a process comprising:

(I) heating a mixture comprising the monomers useful in any of the copolyesters in the invention in the presence of a catalyst at a temperature of 150 to 240° C. for a time sufficient to produce an initial copolyester;

(II) heating the initial copolyester of step (I) at a temperature of 240 to 320° C. for 1 to 4 hours; and (III) removing any unreacted glycols.

Suitable catalysts for use in this process include, but are not limited to, organo-zinc or tin compounds. The use of this type of catalyst is well known in the art. Examples of catalysts useful in the present invention include, but are not limited to, zinc acetate, butyltin tris-2-ethylhexanoate, dibutyltin diacetate, and dibutyltin oxide. Other catalysts may include, but are not limited to, those based on titanium, zinc, manganese, lithium, germanium, and cobalt. Catalyst amounts can range from 10 ppm to 20,000 ppm or 10 to 10,000 ppm, or 10 to 5000 ppm or 10 to 1000 ppm or 10 to 500 ppm, or 10 to 300 ppm or 10 to 250 based on the catalyst metal and based on the weight of the final polymer. The process can be carried out in either a batch or continuous process.

Typically, step (I) can be carried out until 50% by weight or more of the glycol has been reacted. Step (I) may be carried out under pressure, ranging from atmospheric pressure to 100 psig. The term "reaction product" as used in connection with any of the catalysts useful in the invention refers to any product of a polycondensation or esterification reaction with the catalyst and any of the monomers used in making the polyester as well as the product of a polycondensation or esterification reaction between the catalyst and any other type of additive.

Typically, step (II) and step (III) can be conducted at the same time. These steps can be carried out by methods known in the art such as by placing the reaction mixture under a pressure ranging from 0.002 psig to below atmospheric pressure, or by blowing hot nitrogen gas over the mixture.

In one aspect the invention comprises a copolyester composition concentrate comprising the copolyester and a flame retardant comprising a polymer comprising a sulfonyl moiety and a phenyl phosphonate moiety, wherein the concentrate comprises greater than 15 wt % of the flame retardant based on the total weight of the concentrate. In one aspect the invention comprises a copolyester composition concentrate comprising the copolyester and a flame retardant consisting essentially of a polymer having both a sulfonyl moiety and a phenyl phosphonate moiety, wherein the concentrate comprises greater than 15 wt % of the flame retardant based on the total weight of the concentrate. In one aspect the invention comprises a copolyester composition concentrate comprising the copolyester and a flame retardant consisting essentially of polysulfonyldiphenylene phenylphosphonate, wherein the concentrate comprises greater than 15 wt % of the flame retardant based on the total weight of the concentrate. Alternatively, the flame retardant in the concentrate may comprise more than 20 wt % or more than 30 wt % or more than 40 wt % or more than 50 wt % or more than 60 wt % or more than 70 wt % or more than 80 wt % or more than 90 wt % of the copolyester concentrate based on the total weight of the concentrate.

The flame retardant can be incorporated into the copolyester in a concentrate form by any conventional method for ultimate formation into an article.

The flame retardant can be incorporated in a plastics compounding line such as a twin screw compounding line to form a copolyester composition concentrate. In this case copolyester pellets are dried for 4 to 6 hours at 150° F. to 160° F. (65.6° C. to 71.1° C.) to reduce moisture. The pellets are then fed into the throat of the extruder and melted from 430° F. to 520° F. (221° C. to 271° C.) to produce a viscous thermoplastic material. Alternatively, the flame retardant is pre-blended and added as a single powder with a loss-in-weight feeder or added singly in a loss-in-weight feeder. The rotation of the two screws disperses the flame retardant into the copolyester. The mixture is then extruded through a die to produce multiple strands. In certain embodiments, the strands are fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

Alternatively, the flame retardants are incorporated into a plastics compounding line such as a two-rotor continuous compounding mixer (such as a Farrell Continuous Mixer) to form a copolyester composition concentrate. In this case copolyester pellets are dried for 4 to 6 hours at 150° F. to 160° F. (65.6° C. to 71.1° C.) to reduce moisture. The copolyester pellets and the flame retardant are fed into the throat of the continuous mixer and melted into a homogenous mixture at 430° F. to 520° F. (221° C. to 271° C.). The output rate of the mixer is controlled by varying the area of a discharge orifice. The melt can be sliced off into 'loaves' and fed to a two roll mill or the throat of a single screw extruder. In the case of the melt being fed to a two-roll mill, the melt covers one of the rolls to form a sheet of the concentrate which is cut into strips which are fed to the throat of a single screw extruder. The mixture is then extruded through a die to produce multiple strands. The strands are fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water. In the case of the 'loaves' (relatively large portions of the concentrate) being fed to a single screw extruder, the mixture is extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

Alternatively, the flame retardant is incorporated in a high-intensity mixer such a Banbury® batch type mixer to form a copolyester composition concentrate. In this case, the copolyester pellets can be dried for 4 to 6 hours at 150° F. to 160° F. (65.6° C. to 71.1° C.) to reduce moisture. The copolyester pellets and the flame retardants are charged into a high-intensity mixer and a ram lowered to compress the pellet/flame retardants mixture into the mixing chamber. Two rotating mixer blades melt the pellets and disperse the flame retardant into the melt. When the desired temperature is reached, a door is opened in the bottom of the mixer and the mixture is dropped onto a two roll mill. A ribbon from the two roll mill can then be fed to a single screw extruder. The mixture is then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

The present invention includes plastic articles comprising the copolyester compositions. The plastic articles may be made by processes comprising, but not limited to, extrusion of the copolyester composition to produce a continuous flat sheet or profile or injection molding to create discrete articles or calendaring to produce a continuous film or sheet.

Films and/or sheets useful in the present invention can be of any thickness which would be apparent to one of ordinary skill in the art. In one embodiment, the films(s) of the invention have a thickness of less than 30 mils or less than 20 mils or less than 10 mils or less than 5 mils. In one embodiment, the sheets of the invention have a thickness of greater than 30 mils. In one embodiment, the sheets of the invention have a thickness of from 30 mils to 100 mils or from 30 mils to 200 mils or from 30 mils to 500 mils.

The invention further relates to the films and/or sheets comprising the polyester compositions of the invention. The methods of forming the polyesters into films and/or sheets are well known in the art. Examples of films and/or sheets of the invention include, but are not limited to, extruded films and/or sheets, calendared films and/or sheets, compression molded films and/or sheets, injection molded films or sheets, and solution casted films and/or sheets. Methods of making film and/or sheet include but are not limited to extrusion, calendaring, extrusion molding, compression molding, and solution casting. These films or sheets may be made or subjected to further processing such as orientation (uniaxial or biaxial), heat setting, surface treatment, etc.

In one embodiment of the invention comprises a flat sheet or profile. The sheet or profile is prepared by extruding the copolyester composition to produce a flat sheet or profile. In this case, pellets of the copolyester composition are dried at 150° F. to 160° F. (65.6° C. to 71.1° C.) for 4 to 6 hours and are then fed to either a single screw extruder, a twin-screw extruder, or a conical twin screw extruder. The copolyester composition pellets are conveyed and compressed by the screw(s) down the extruder barrel to melt the pellets and discharge the melt from the end of the extruder. The melt is fed through a screening device to remove debris and/or a melt pump to reduce pressure variations caused by the extruder. The melt is then fed through a die to create a continuous flat sheet or into a profile die to create a continuous shape. In one embodiment of the invention comprising a flat sheet die, the melt is extruded onto a series of metal rolls, typically three, to cool the melt and impart a finish onto the sheet. The flat sheet is then conveyed in a continuous sheet for a distance or period of time sufficient to cool the sheet. The sheet is then trimmed to the desired width and then either rolled up into a roll or sheared or sawed into sheet form of desired dimensions. A flat sheet can also be formed into a shaped article through mechanical means to form a desired shaped article and then cooled either by spraying with water, by conveying through a water trough or by blowing air on the shaped article. The article then sawed or sheared to the desired length. In the case of a profile die, the die is designed to produce the desired shape of the profile. After exiting the die, the profile is then cooled either by spraying with water, by conveying through a water trough or by blowing air on the profile. The profile is then sawed or sheared to the desired length. In the case of a fiber, the fiber can be pulled out of the extrusion die spinnerets to the desired fiber diameter and crystallized for physical property enhancement.

Another embodiment of the invention comprises mixing neat copolyester pellets with a concentrate of flame retardant and then extruding the copolyester composition. The flame retardant concentrate can be compounded as a pellet. The pellets are dried at 150° F. to 160° F. (65.6° C. to 71.1° C.) for 4 to 6 hours before extrusion. The pellets are dried after being blended in a low-intensity mixer such as a ribbon blender, a tumbler, or conical screw blender. The pellets are then fed to an extruder including, but not limited to, a single screw extruder, a twin-screw extruder, or a conical twin screw extruder. The pellets are conveyed and compressed by the screw(s) down the extruder barrel to melt the pellets and discharge the melt from the end of the extruder. The melt is typically fed through a screening device to remove debris and/or a melt pump to reduce pressure variations caused by the extruder. The melt is then fed through a die to create a continuous flat sheet or into a profile die to create a continuous shape. In the case of the flat sheet die, the melt is extruded onto a series of metal rolls, typically three, to cool the melt and impart a finish onto the sheet. The flat sheet is then conveyed in a continuous sheet for a distance or period of time sufficient to cool the sheet. It can then be trimmed to the desired width and then either rolled up into a roll or sheared or sawed into sheet form. A flat sheet can also be formed into a shape through mechanical means to form a desired shape and then cooled either by spraying with water, through a water trough or by blowing air on the shaped article. It can then be sawed or sheared to the desired length. In the case of a film, the film may be produced and wound into a roll. In the case of a profile die, the die is designed to produce the desired shape of the article. After exiting the die, the profile can then be cooled either by spraying with water, through a water trough or by blowing air on the profile. It can then be sawed or sheared to the desired length. In the case of a fiber, the fiber can be pulled out of the extrusion die spinnerets to the desired fiber diameter and crystallized for physical property enhancement.

Another embodiment of the invention consists of mixing neat copolyester pellets with a flame retardant concentrate and then extruding them with either short or long strand glass fiber reinforcement or extruding them into a continuous glass fiber composite film, sheet or tape. The flame retardant can be compounded as a single pellet. The pellets are dried at 150° F. to 160° F. (65.6° C. to 71.1° C.) for 4 to 6 hours before extrusions. The pellets can be dried separately or together after being blended in a low-intensity mixer such as a ribbon blender, a tumbler, or conical screw blender. The pellets are then fed to either a single screw extruder, a twin-screw extruder, or a conical twin screw extruder. The pellets are conveyed and compressed by the screw(s) down the extruder barrel to melt the pellets and discharge the melt from the end of the extruder. The melt can be fed through a screening device to remove debris and/or a melt pump to reduce pressure variations caused by the extruder. The melt can then be fed through a die to create a continuous flat sheet or into a profile die to create a continuous shape. In the case of the flat sheet die, the melt is extruded onto a series of metal rolls, typically three, to cool the melt and impart a finish onto the sheet. The flat sheet is then conveyed in a continuous sheet to cool the sheet. It can then be trimmed to the desired width and then either rolled up into a roll or sheared or sawed into sheet form. A flat sheet can also be formed into a shape through mechanical means to form a desired shape and then cooled either by spraying with water, through a water trough or by blowing air on the profile. It can then be sawed or sheared to the desired length or a film may be produced and wound into a roll. In the case of a profile die, the die is designed to produce the desired shape of the article. After exiting the die, it can then be cooled either by spraying with water, through a water trough or by blowing air on the profile. It can then be sawed or sheared to the desired length. In the case of a fiber, the fiber can be pulled out of the extrusion die spinnerets to the desired fiber diameter and crystallized for physical property enhancement.

Another embodiment of the invention comprises extruding fully compounded pellets of the copolyester composition, comprising the copolyester and flame retardants, to produce an injection molded article. In this case, the pellets are dried at 150° F. to 160° F. (65.6° C. to 71.1° C.) for 4 to 6 hours to dry the pellets which are then fed to a reciprocating single screw extruder. The pellets are melted by the screw rotation and reciprocating action. Once the pellets reach the desired temperature, a gate is opened at the end of the extruder and the melted plastic is pumped by the screw into a heated mold to form an article of the desired shape. Once the mold is filled, a coolant is pumped through the mold to cool it and the melted plastic. Once the plastic has solidified, the mold is opened and the article is removed from the mold.

Another embodiment of the invention comprises mixing neat copolyester pellets with a concentrate of the flame retardant to form the copolyester composition and then extruding the copolyester composition to produce an injection molded article with or without short or long strand glass fiber reinforcement. The pellets are dried at 150° F. to 160° F. (65.6° C. to 71.1° C.) for 4 to 6 hours and are then fed to a reciprocating single screw extruder. The pellets can be dried separately or together after being blended in a low-intensity mixer including, but not limited to, a ribbon blender, a tumbler, or conical screw blender. Once the pellets reach the desired temperature, a gate is opened at the end of the extruder and the melted plastic is pumped by the screw into a heated mold to form an article of the desired shape. Once the mold is filled, a coolant is pumped through the mold to cool it and the melted plastic. Once the plastic has solidified, the mold is opened and the article is removed from the mold.

Another embodiment of the invention comprises mixing neat copolyester pellets with a concentrate of flame retardants to form the copolyester composition and then calendaring the copolyester composition to produce a film product. Calendering is a well-known process of forming a film or sheet through successive co-rotating parallel rollers. In the calendaring process, the pellets do not need to be pre-dried as the processing temperatures are low enough (350° F. to 400° F.; 177° C. to 204° C.) so degradation and hydrolysis of the polyester does not occur in a significant amount. The copolyester and flame retardant composition may be melted by using a high intensity mixer or extruder, including but not limited to, Buss Ko-kneader, a planetary gear extruder, Farrell continuous mixer, a twin screw extruder, or a Banbury® type mixer. The melt is then conveyed to the calendar. A calendar typically consists essentially of a system of three or more large diameter heated rollers which convert high viscosity plastic into a film or sheet. The flat sheet or film is conveyed in a continuous web to cool the sheet. It can then be trimmed to the desired width and then either rolled up into a roll or sheared or sawed into sheet form.

Although the copolyester composition may be prepared by mixing or blending a concentrate of flame retardants and copolyester, the copolyester composition may alternatively be prepared by blending the flame retardants directly with the copolyester, using any of the mixing or blending processed previously described for making the copolyester composition by blending the flame retardant concentrate and the copolyester. The two flame retardants may be mixed or blended with the copolyester simultaneously or sequentially.

This invention can be further illustrated by the following examples of preferred embodiments thereof, although it will be understood that these examples are included merely for purposes of illustration and are not intended to limit the scope of the invention unless otherwise specifically indicated.

EXAMPLES

The following abbreviations are used: kN is kiloNewtons; J is Joules; % NB is percent no break; J/m is Joules per meter; LOI is Loss On Ignition; wt % is weight percent; TGA is thermographic analysis; TPA is terephthalic acid; and 1,4-CHDM is 1,4-cyclohexanedimethanol. PETG is a glycol modified polyethylene terephthalate. The PETG used in the examples is copolyester A, copolyester B and copolyester C with the compositions shown in Table 1. Samples were prepared similarly by mixing the copolyester A, B, or C and the flame retardant in a 30 mm twin screw compounding extruder at approximately 450° F. to make pellets of each formulation. Samples of each formulation were then injection molded to produce test samples for flammability, tensile properties, instrumented impact, limiting oxygen index and thermal gravimetric analysis. Sheet samples were prepared for the ASTM E84 by mixing pellets of copolyester A, B or C and flame retardant concentrates and extruding sheet on an extrusion line at approximately 450° F. For ASTM D638 the Type I tensile bar crosshead speed was 50.8 mm/minute. For ASTM D3763 the initial velocity was about 3.2 meters/second; the maximum force range of the tup was 17.9 kN; the sample support diameter (clamp inside diameter) is 76.0 mm and the tup diameter is 12.8 mm. For UL94 the test used Section 8 50W (20 mm) Vertical Burn Test: V-0, V-1 or V-2.

TABLE 1

| Copolyester | TPA | EG | CHDM |
| --- | --- | --- | --- |
| A | 100 | 86 | 12 |
| B | 100 | 69 | 31 |
| C | 100 | 63.3 | 36.7 |

Examples 1 and 2, in Table 2, demonstrate the low haze of less than 6% and high light transmittance of 89% for copolyester B with 6 wt % PSPPP. In contrast, copolyester B with 10 wt % Spectar™ FR1000 which contains a combination of a metal phosphinate and a melamine had a high haze of 101% and low light transmittance of about 24%.

TABLE 2

| Example | Flame retardant wt % | Copolyester | Haze % (ASTM D1003) | Light Transmittance % (ASTM D1003) | ASTM D523 GLOSS |
| --- | --- | --- | --- | --- | --- |
| 1 | 10 SPECTAR FR1000 | Copolyester B | 101 | 23.7 | 55.2 |
| 2 | 6 PSPPP | Copolyester B | 5.47 | 89.2 | 119.4 |

Examples 3 to 8, in Table 3, demonstrate that the glass transition temperature is maintained at about 78° C. for copolyester B with 2 to 10 wt % PSPPP. Examples 3 to 6 all achieved a UL 94 rating of V-0 while examples 7 and 8 achieved a V-2 rating. The energy at max load was maintained above about 23 J for all examples (except for example 4 with 8 wt % PSPPP). However, a higher load of 10 wt % PSPPP still maintained an energy at max load value greater than 23 J.

TABLE 3

| | | Tensile Properties - ASTM D638 | | | | | Instrumented Impact - ASTM D3763 | | | | | UL94 | | |
| --- | --- | --- | --- | --- | --- | --- | --- | --- | --- | --- | --- | --- | --- | --- |
| Sample # | Total PSPP % | Yield Strength (Mpa) | Elongation at Yield % | Break Strength (Mpa) | Elongation at Break % | Modulus (Mpa) | Max Load (kN) | Energy Max Load (J) | Total Energy (J) | Brittle % | Glass Transition Temperature ° C. | Burn Time (s) | Rating | Comments |
| 3 | 10 | 53.539 | 3.446 | 53.539 | 3.446 | 2267.788 | 3.24 | 23.82 | 34.32 | 40 | 79.52 | 0 | 94 V-0 | (9) dripped, did not ignite (1) did not drip |
| 4 | 8 | 26.449 | 1.263 | 26.449 | 1.263 | 2332.588 | 0.159 | 0.79 | 0.9 | 100 | 77.46 | 0 | 94 V-0 | (10) dripped, did not ignite |
| 5 | 6 | 58.587 | 4.317 | 37.244 | 5.03 | 2244.586 | 3.23 | 25.48 | 40.27 | 20 | 76.27 | 0 | 94 V-0 | (10) dripped, did not ignite |
| 6 | 6 | 48.39 | 3.46 | 48.98 | 314.6 | 2082.72 | 3.9 | 31.6 | 46.6 | 20 | 80.64 | | 94 V-0 | |
| 7 | 4 | 56.481 | 4.376 | 24.751 | 7.904 | 2169.33 | 3.81 | 33.04 | 50.75 | 0 | 77.65 | 0.6 | 94 V-0 | (7) dripped, did not ignite (3) dripped and did ignite |
| 8 | 2 | 54.689 | 4.339 | 24.075 | 7.956 | 2108.278 | 3.59 | 26.62 | 45.15 | 0 | 77.24 | 1.2 | 94 V-0 | (5) dripped, did not ignite (5) dripped and did ignite |

Samples of copolyester A, copolyester B and copolyester C were melt compounded with triphenyl phosphite (TPPi) at loadings from 0.25% to 3%. Copolyester A required at least 2% TPPi to achieve a UL 94 V-0 rating and remain clear. Copolyester B required 3% TPPi to achieve a UL 94 V-0 rating and remain clear. TPPi incorporated with copolyester C never achieved a V-0 rating. Copolyester A and copolyester B, however, dropped in heat distortion temperature (ASTM 648) from 64° C. to 57° C. to 52° C. for copolyester A and from 65.25° C. to 49.8° C. for copolyester B. This drop in heat distortion temperature is very undesirable.

Examples 9-29: Flame Retarded Copolyester Blend with Tri-Phenyl Phosphite

TABLE 4

| | | | | | Instrumented Impact ASTM 3763 | | | |
|---|---|---|---|---|---|---|---|---|
| Example | Polymer | target % TPPI | HDT, 264 PSI ASTM D648 T [° C.] | % Brittle | 0.125 Energy @Max Load [ft-lb] | Facture Energy [ft-lb] | Max Load [lb] | Thickness [in] |
| 9 | Copolyester A Control | 0 | 64.65 | 0.00 | 24.20 | 38.29 | 895.36 | 0.13 |
| 10 | Copolyester A + 0.25 wt % Triphenyl phosphite | 0.25 | | | | | | |
| 11 | Copolyester A + 0.5 wt % Triphenyl phosphite | 0.5 | 64.10 | 0.00 | 23.61 | 37.66 | 902.05 | 0.13 |
| 12 | Copolyester A + 0.75 wt % Triphenyl phosphite | 0.75 | | | | | | |
| 13 | Copolyester A + 1 wt % Triphenyl phosphite | 1 | 61.45 | 0.00 | 24.68 | 38.61 | 886.21 | 0.12 |
| 13a | Copolyester A + 1 wt % Triphenyl phosphite | 0.5 | 63.75 | 0.00 | 26.78 | 39.51 | 938.99 | 0.12 |
| 13b | Copolyester A + 1 wt % Triphenyl phosphite | 0.5 | 62.00 | 0.00 | 26.13 | 40.15 | 918.58 | 0.13 |
| 14 | Copolyester A + 2 wt % Triphenyl phosphite | 2 | 57.10 | 0.00 | 24.94 | 36.72 | 921.75 | 0.13 |
| 15 | Copolyester A + 3 wt % Triphenyl phosphite | 3 | 52.75 | 20.00 | 22.25 | 36.31 | 848.22 | 0.13 |
| 15a | Copolyester A + 3 wt % Triphenyl phosphite | 3 | 55.35 | 20.00 | 23.07 | 34.78 | 882.70 | 0.13 |
| 16 | Copolyester B Control | 0 | 65.25 | 0.00 | 26.46 | 39.43 | 902.40 | 0.12 |
| 17 | Copolyester B + 0.25 wt % Triphenyphosphite | 0.25 | | | | | | |
| 18 | Copolyester B + 0.5 wt % Tripheny phosphite | 0.5 | 64.90 | 0.00 | 27.17 | 41.46 | 906.97 | 0.13 |
| 19 | Copolyester B + 0.75 wt % Triphenyphosphite | 0.75 | | | | | | |
| 20 | Copolyester B + 1 wt % Triphenyphosphite | 1 | 60.75 | 0.00 | 26.29 | 41.16 | 904.16 | 0.13 |
| 21 | Copolyester B + 2 wt % Triphenyphosphite | 2 | 55.10 | 0.00 | 26.14 | 38.15 | 922.80 | 0.13 |
| 22 | Copolyester B + 3 wt % Triphenyphosphite | 3 | 49.80 | 0.00 | 25.41 | 37.73 | 916.12 | 0.13 |
| 23 | Copolyester C Control | 0 | 67.90 | 0.00 | 30.67 | 41.46 | 944.62 | 0.13 |
| 24 | Copolyester C + 0.25 wt % Tripheny phosphite | 0.25 | | | | | | |
| 25 | Copolyester C + 0.5 wt % Tripheny phosphine | 0.5 | 64.60 | 0.00 | 33.40 | 44.76 | 958.69 | 0.13 |
| 26 | Copolyester C + 0.75 wt % Triphenyphosphite | 0.75 | | | | | | |
| 27 | Copolyester C + 1 wt % Triphenyphosphite | 1 | 64.35 | 20.00 | 32.37 | 44.00 | 963.26 | 0.13 |
| 28 | Copolyester C + 2 wt % Triphenyphosphite | 2 | 53.30 | 0.00 | 27.34 | 39.96 | 912.25 | 0.13 |
| 29 | Copolyester C + 3 wt % Triphenyphosphite | 3 | 52.25 | 0.00 | 24.86 | 36.80 | 864.40 | 0.13 |

| | | | | UL94 -TESTED AS IS | | | |
|---|---|---|---|---|---|---|---|
| | | MAF | TAF | % OF Yes | | | UL94 |
| Example | Polymer | (sec) | (sec) | IC | B2C | Drip | Rating |
| 9 | Copolyester A Control | 3.00 | 10.00 | 100% | 0% | 100% | V-2 |
| 10 | Copolyester A + 0.25 wt % Triphenyl phosphite | 1.00 | 5.00 | 100% | 0% | 100% | V-2 |
| 11 | Copolyester A + 0.5 wt % Triphenyl phosphite | 2.00 | 3.00 | 40% | 0% | 40% | V-2 |
| 12 | Copolyester A + 0.75 wt % Triphenyl phosphite | 0.00 | 0.00 | 100% | 0% | 0% | V-0 |
| 13 | Copolyester A + 1 wt % Triphenyl phosphite | 0.00 | 1.00 | 20% | 0% | 100% | V-2 |
| 13a | Copolyester A + 1 wt % Triphenyl phosphite | 1.00 | 3.00 | 40% | 0% | 80% | V-2 |
| 13b | Copolyester A + 1 wt % Triphenyl phosphite | 2.00 | 5.00 | 100% | 0% | 100% | V-2 |
| 14 | Copolyester A + 2 wt % Triphenyl phosphite | 0.00 | 0.00 | 0% | 0% | 60% | V-0 |
| 15 | Copolyester A + 3 wt % Triphenyl phosphite | 0.00 | 0.00 | 0% | 0% | 0% | V-0 |
| 15a | Copolyester A + 3 wt % Triphenyl phosphite | 0.00 | 0.00 | 0% | 0% | 0% | 0 |
| 16 | Copolyester B Control | 5.00 | 21.00 | 100% | 0% | 100% | V-2 |

TABLE 4-continued

| | | | | IC | B2C | Drip | |
|---|---|---|---|---|---|---|---|
| 17 | Copolyester B + 0.25 wt % Triphenyphosphite | 1.00 | 4.00 | 100% | 0% | 100% | V-2 |
| 18 | Copolyester B + 0.5 wt % Tripheny phosphite | 1.00 | 3.00 | 100% | 0% | 100% | V-2 |
| 19 | Copolyester B + 0.75 wt % Triphenyphosphite | 0.00 | 0.00 | 100% | 0% | 100% | V-2 |
| 20 | Copolyester B + 1 wt % Triphenyphosphite | 1.00 | 2.00 | 100% | 0% | 100% | V-2 |
| 21 | Copolyester B + 2 wt % Triphenyphosphite | 1.00 | 1.00 | 100% | 0% | 100% | V-2 |
| 22 | Copolyester B + 3 wt % Triphenyphosphite | 0.00 | 0.00 | 0% | 0% | 40% | V-0 |
| 23 | Copolyester C Control | 4.00 | 21.00 | 100% | 0% | 100% | V-2 |
| 24 | Copolyester C + 0.25 wt % Tripheny phosphite | 4.00 | 17.00 | 100% | 0% | 100% | V-2 |
| 25 | Copolyester C + 0.5 wt % Tripheny phosphine | 2.00 | 6.00 | 100% | 0% | 100% | V-2 |
| 26 | Copolyester C + 0.75 wt % Triphenyphosphite | 1.00 | 2.00 | 100% | 0% | 100% | V-2 |
| 27 | Copolyester C + 1 wt % Triphenyphosphite | 1.00 | 2.00 | 100% | 0% | 100% | V-2 |
| 28 | Copolyester C + 2 wt % Triphenyphosphite | 1.00 | 1.00 | 100% | 0% | 100% | V-2 |
| 29 | Copolyester C + 3 wt % Triphenyphosphite | 1.00 | 1.00 | 100% | 0% | 100% | V-2 |

| | | UL94 -CONDITIONED | | | | | |
|---|---|---|---|---|---|---|---|
| | | MAF | TAF | % OF Yes | | | UL94 |
| Example | Polymer | (sec) | (sec) | IC | B2C | Drip | Rating |
| 9 | Copolyester A Control | 4 | 28 | 100% | 0% | 100% | V-2 |
| 10 | Copolyester A + 0.25 wt % Triphenyl phosphite | 5 | 23 | 100% | 0% | 100% | V-2 |
| 11 | Copolyester A + 0.5 wt % Triphenyl phosphite | 6 | 15 | 100% | 0% | 100% | V-2 |
| 12 | Copolyester A + 0.75 wt % Triphenyl phosphite | 1 | 1 | 100% | 0% | 100% | V-2 |
| 13 | Copolyester A + 1 wt % Triphenyl phosphite | 1 | 1 | 80% | 0% | 100% | V-2 |
| 13a | Copolyester A + 1 wt % Triphenyl phosphite | 2 | 5 | 100% | 0% | 100% | V-2 |
| 13b | Copolyester A + 1 wt % Triphenyl phosphite | 0 | 0 | 0% | 0% | 100% | V-0 |
| 14 | Copolyester A + 2 wt % Triphenyl phosphite | 0 | 0 | 0% | 0% | 100% | V-0 |
| 15 | Copolyester A + 3 wt % Triphenyl phosphite | 0 | 0 | 0% | 0% | 60% | V-0 |
| 15a | Copolyester A + 3 wt % Triphenyl phosphite | 1 | 1 | 80% | 0% | 100% | V-2 |
| 16 | Copolyester B Control | 9 | 41 | 100% | 0% | 100% | V-2 |
| 17 | Copolyester B + 0.25 wt % Triphenyphosphite | 5 | 17 | 100% | 0% | 100% | V-2 |
| 18 | Copolyester B + 0.5 wt % Tripheny phosphite | 4 | 13 | 100% | 0% | 100% | V-2 |
| 19 | Copolyester B + 0.75 wt % Triphenyphosphite | | | | 0% | 100% | |
| 20 | Copolyester B + 1 wt % Triphenyphosphite | 2 | 3 | 100% | 0% | 100% | V-2 |
| 21 | Copolyester B + 2 wt % Triphenyphosphite | 1 | 1 | 100% | 0% | 100% | V-2 |
| 22 | Copolyester B + 3 wt % Triphenyphosphite | 0 | 0 | 0% | 0% | 100% | V-0 |
| 23 | Copolyester C Control | 10 | 47 | 100% | 0% | 100% | V-2 |
| 24 | Copolyester C + 0.25 wt % Tripheny phosphite | 4 | 19 | 100% | 0% | 100% | V-2 |
| 25 | Copolyester C + 0.5 wt % Tripheny phosphine | 3 | 9 | 100% | 0% | 100% | V-2 |
| 26 | Copolyester C + 0.75 wt % Triphenyphosphite | 3 | 11 | 100% | 0% | 100% | V-2 |
| 27 | Copolyester C + 1 wt % Triphenyphosphite | 3 | 5 | 100% | 0% | 100% | V-2 |
| 28 | Copolyester C + 2 wt % Triphenyphosphite | 1 | 2 | 100% | 0% | 100% | V-2 |
| 29 | Copolyester C + 3 wt % Triphenyphosphite | 0 | 0 | 60% | 0% | 100% | V-2 |

Examples 30 to 32, in Tables 5, demonstrate that UL 94 V-0 ratings are maintained for copolyester B with 5 to 8 wt % of PSPPP. The energy at max load was maintained above about 15 J for all Examples in this group (except for example 32 with 8 wt % PSPPP). Examples 30 to 32 all achieved a UL 94 V-0 before and after aging samples at 70° C. for 168 hours.

TABLE 5

| | | Instrumented Impact - ASTM D3763 | | | |
|---|---|---|---|---|---|
| Example | PSPPP Concentration % | Max Load (kN) | Energy Max Load (J) | Total Energy (J) | Break Type |
| 30 | 5 | 3.28 | 21.79 | 30.93 | 60% B |
| 31 | 6 | 2.79 | 16.19 | 20.2 | 80% B |
| 32 | 8 | 0.81 | 1.05 | 1.35 | 100% B |

| | | | | UL 94 Results Before Aging | | | | | |
|---|---|---|---|---|---|---|---|---|---|
| Example | PSPPP Concentration % | Total After-Flame (t1 + t2) | Reps Igniting Cotton (DIC) | Classification | Total Drips | Max Flame Time | Total Flame & Glow Time | Number Burn to Clamp | After-Flame Time (t1) | After-Flame Time (t2) |
| 30 | 5 | 0 | 0 | V-0 | 10 | 0 | 0 | 0 | 0, 0, 0, 0, 0 | 0, 0, 0, 0, 0 |
| 31 | 6 | 0 | 0 | V-0 | 10 | 0 | 0 | 0 | 0, 0, 0, 0, 0 | 0, 0, 0, 0, 0 |
| 32 | 8 | 0 | 0 | V-0 | 10 | 0 | 0 | 0 | 0, 0, 0, 0, 0 | 0, 0, 0, 0, 0 |

TABLE 5-continued

| Example | PSPPP Concentration % | Total After Flame (t1 + t2) | Reps Igniting Cotton (DIC) | Classification | Total Drips | Max Flame Time | Total Flame & Glow Time | Number Burn to Clamp | After-Flame Time (t1) | After-Flame Time (t2) |
|---|---|---|---|---|---|---|---|---|---|---|
| | | | | UL 94 Results After Aging | | | | | | |
| 30 | 5 | 11 | 0 | V-0 | 10 | 2 | 5 | 0 | 2, 1, 1, 1, 1 | 1, 1, 1, 1, 1 |
| 31 | 6 | 11 | 0 | V-0 | 10 | 2 | 5 | 0 | 2, 1, 1, 1, 1 | 1, 1, 1, 1, 1 |
| 32 | 8 | 10 | 0 | V-0 | 10 | 1 | 5 | 0 | 1, 1, 1, 1, 1 | 1, 1, 1, 1, 1 |

Examples 33 to 36, in Table 6, demonstrate that clarity is maintained for compositions of copolyester B with various concentrations of PSPPP. Examples 33 to 35 with 5 wt % to 8 wt % of PSPPP all achieved a high % of light transmissions with low haze values. Example 36 with no PSPPP had high light transmission and low haze.

TABLE 6

| Example | PSPPP Concentration % | Light Transmission % (ASTM D1003) | Haze |
|---|---|---|---|
| 33 | 5 | 87.6 | 0.79 |
| 34 | 6 | 87.1 | 0.86 |
| 35 | 8 | 85.6 | 0.89 |
| 36 | 0 | 90.80 | 0.62 |

Examples 37 to 40, in Table 7, demonstrate that UL-94 V-2 and V-0 results can be achieved for copolyester B at 15 mil thickness. Example 37 failed to achieve a rating at 2 wt % PSPPP. Examples 38 and 39, at 3 wt % and 4 wt % PSPPP achieved a V-2 rating. Example 40 achieved a V-0 rating at 5 wt % PSPPP.

TABLE 7

| Example | PSPPP Concentration % | Reps Igniting Cotton (DIC) | Total After-Flame (t1 + t2) | Rating |
|---|---|---|---|---|
| | | UL 94 | | |
| 37 | 2 | 0 | 5 | FAIL |
| 38 | 3 | 4 | 10 | V-2 |
| 39 | 4 | 5 | 11 | V-2 |
| 40 | 5 | 0 | 15 | V-0 |

Examples 41 to 44, in Table 8, demonstrate that UL-94 VTM-2 and VTM-0 ratings can be achieved for copolyester B at a 5 mil thickness. Examples 41 and 42, with 2 wt % and 3 wt % PSPPP achieved a UL-94 VTM-2 rating. Examples 43 and 44, with 4 and 5 wt % of PSPPP achieved a UL-94 VTM-0 rating. Generally, when the thickness of the material decreases, it is more difficult to maintain flammability performance. However, for very thin films with 5 mil thickness in Examples 43 and 44 VTM-0 rating were achieved and Examples 41 and 42 achieved VTM-2 ratings.

TABLE 8

| Example | Wt % PSPPP | Total After-Flame (t1 + t2) | Reps Igniting Cotton (DIC) | Rating | Total Drips | Max Flame Time | Total Flame & Glow Time | Number Burn to Clamp | After-Flame Time (t1) | After-Flame Time (t2) |
|---|---|---|---|---|---|---|---|---|---|---|
| | | | | UL 94 VTM | | | | | | |
| 41 | 2 | 17 | 4 | VTM-2 | 7 | 4 | 7 | 0 | 1, 2, 1, 4, 2 | 1, 1, 1, 2, 2 |
| 42 | 3 | 14 | 3 | VTM-2 | 7 | 3 | 6 | 0 | 2, 1, 3, 1, 1 | 1, 2, 1, 1, 1 |
| 43 | 4 | 10 | 0 | VTM-0 | 4 | 1 | 5 | 0 | 1, 1, 1, 1, 1 | 1, 1, 1, 1, 1 |
| 44 | 5 | 10 | 0 | VTM-0 | 6 | 1 | 5 | 0 | 1, 1, 1, 1, 1 | 1, 1, 1, 1, 1 |

The invention has been described in detail with reference to the embodiments disclosed herein, but it will be understood that variations and modifications can be effected within the spirit and scope of the invention.

We claim:

1. A copolyester composition comprising:
    (a) from greater than about 90 to about 98 wt % of a copolyester comprising
        (i) a diacid component comprising
            from 70 to 100 mole % residues of terephthalic acid,
            from 0 to 30 mole % residues of a modifying aromatic diacid having from 8 to 12 carbon atoms, and
            from 0 to 10 mole % residues of an aliphatic dicarboxylic acid; and
        (ii) a glycol component comprising
            from 1 to 65 mole % cyclohexanedimethanol residues and
            from 35 to 99 mole % of a modifying glycol having 2 to 20 carbon atoms;
    (b) from about 2 to about 10 wt % of a polymeric flame retardant that is a polymer comprising a sulfonyl moiety and a phenyl phosphonate moiety,
    wherein the copolyester composition has a UL 94 V-0 rating from using the polymer comprising a sulfonyl moiety and a phenyl phosphonate moiety alone as the flame retardant,
    wherein the copolyester composition has an energy at maximum load of greater than about 15 Joules according to ASTM D3763;
    wherein the copolyester composition has less than about 10% haze according to ASTM D1003,
    wherein the wt % is based on the weight of the copolyester composition,
    wherein the total mole % of the dicarboxylic acid component is 100 mole % and the total mole % of the glycol component is 100 mole %.

2. The copolyester composition according to claim 1 wherein the copolyester composition comprises:
(a) from about 90 to about 96 wt % of the copolyester; and
(b) from about 4 to about 10 wt % of the flame retardant, wherein the copolyester composition has a UL 94 V-0 rating.

3. The copolyester composition according to claim 1 wherein the copolyester composition comprises:
(a) from about 92 to about 98 wt % of the copolyester; and
(b) from about 2 to about 8 wt % of the flame retardant, wherein the copolyester composition has a UL 94 V-0 rating.

4. The copolyester composition according to claim 1 wherein the copolyester composition comprises:
(a) from about 92 to about 96 wt % of the copolyester; and
(b) from about 4 to about 8 wt % of the flame retardant mixture,
wherein the copolyester composition has a UL 94 V-0 rating.

5. The copolyester composition according to claim 1 wherein the copolyester composition comprises:
(a) from about 93 to about 95 wt % of the copolyester; and
(b) from about 5 to about 7 wt % of the flame retardant mixture,
wherein the copolyester composition has a UL 94 V-0 rating.

6. The copolyester composition according to claim 1, wherein the polymer comprising a sulfonyl moiety and a phenyl phosphonate moiety is polysulfonyldiphenylene phenyl phosphonate.

7. The copolyester composition according to claim 1, wherein the copolyester composition has less than about 5% haze.

8. The copolyester composition according to claim 1 wherein the copolyester composition further comprises a drip suppressant or an impact modifier or mixtures thereof.

9. A method of making a copolyester composition, the method comprising blending:
(a) from greater than about 90 to about 98 wt % of a copolyester comprising
(i) a diacid component comprising
from 70 to 100 mole % residues of terephthalic acid,
from 0 to 30 mole % residues of a modifying aromatic diacid having from 8 to 12 carbon atoms, and
from 0 to 10 mole % residues of an aliphatic dicarboxylic acid; and
(ii) a glycol component comprising
from 1 to 65 mole % cyclohexanedimethanol residues and
from 35 to 99 mole % of a modifying glycol having 2 to 20 carbon atoms;
(b) from about 2 to about 10 wt % of a polymeric flame retardant that is a polymer comprising a sulfonyl moiety and a phenyl phosphonate moiety,
wherein the copolyester composition has a UL 94 V-0 rating from using the polymer comprising a sulfonyl moiety and a phenyl phosphonate moiety alone as the flame retardant,
wherein the copolyester composition has an energy at maximum load of greater than about 15 Joules according to ASTM D3763;
wherein the copolyester composition has less than about 10% haze according to ASTM D1003,
wherein the wt % is based on the weight of the copolyester composition,
wherein the total mole % of the dicarboxylic acid component is 100 mole % and the total mole % of the glycol component is 100 mole %.

10. The method of making a copolyester composition according to claim 9, wherein (a) the copolyester is from about 93 to about 95 wt %; and (b) the flame retardant from about 5 to about 7 wt %, wherein the copolyester composition has a UL 94 V-0 rating, and wherein the energy at maximum load is greater than about 23 Joules according to ASTM D3763.

11. The method of making a copolyester composition according to claim 9, wherein (a) the copolyester is from about 90 to about 95 wt %; and (b) the flame retardant from about 5 to about 10 wt %, wherein the copolyester composition has a UL 94 V-0 rating, and wherein the energy at maximum load is greater than about 23 Joules according to ASTM D3763.

12. The method of making a copolyester composition according to claim 9, wherein the copolyester composition has less than about 5% haze.

13. The method of making a copolyester composition according to claim 9, wherein the polymer comprising a sulfonyl moiety and a phenyl phosphonate moiety is polysulfonyldiphenylene phenyl phosphonate.

14. The method of making a copolyester composition according to claim 9 wherein the blending comprises at least one of twin screw compounding, two-rotor continuous compounding, Banbury® batch mixer or a combination thereof.

15. An article comprising a copolyester composition comprising:
(a) from greater than about 90 to about 98 wt % of a copolyester comprising
(i) a diacid component comprising
from 70 to 100 mole % residues of terephthalic acid,
from 0 to 30 mole % residues of a modifying aromatic diacid having from 8 to 12 carbon atoms, and
from 0 to 10 mole % residues of an aliphatic dicarboxylic acid; and
(ii) a glycol component comprising
from 1 to 65 mole % cyclohexanedimethanol residues and
from 35 to 99 mole % of a modifying glycol having 2 to 20 carbon atoms;
b) from about 2 to about 10 wt % of a polymeric flame retardant that is a polymer comprising a sulfonyl moiety and a phenyl phosphonate moiety,
wherein the copolyester composition has a UL 94 V-0 rating from using the polymer comprising a sulfonyl moiety and a phenyl phosphonate moiety alone as the flame retardant,
wherein the copolyester composition has an energy at maximum load of greater than about 15 Joules according to ASTM D3763;
wherein the copolyester composition has less than about 10% haze according to ASTM D1003,
wherein the wt % is based on the weight of the copolyester composition,
wherein the total mole % of the dicarboxylic acid component is 100 mole % and the total mole % of the glycol component is 100 mole %.

16. The article according to claim 15, wherein the copolyester composition comprises:
(a) from 90 to 96 wt % of the copolyester; and
b) from 4 to 10 wt % of the flame retardant,
wherein the copolyester composition has a UL 94 V-0 rating.

17. The article according to claim 15, wherein the copolyester composition comprises:
(a) from 92 to 98 wt % of the copolyester; and
b) from 2 to 8 wt % of the flame retardant,
wherein the copolyester composition has a UL 94 V-0 rating.

18. The article according to claim 15, wherein the copolyester composition comprises:
(a) from about 93 to about 98 wt % of the copolyester; and
b) from about 5 to about 7 wt % of the flame retardant,
wherein the copolyester composition has a UL 94 V-0 rating.

19. The article according to claim 15, wherein the polymer comprising a sulfonyl moiety and a phenyl phosphonate moiety is polysulfonyldiphenylene phenyl phosphonate.

20. The article according to claim 15, wherein the copolyester composition has less than about 5% haze.

21. The article according to claim 15, wherein the energy at maximum load is greater than about 23 Joules according to ASTM D3763.

22. The article according to claim 15, wherein the article is produced by extrusion, extrusion blow molding, injection molding, blown film process or calendering.

23. The article according to claim 22, wherein the article is a film, sheet or profile.

24. A clear film comprising a copolyester composition comprising:
(a) from greater than about 93 to about 98 wt % of a copolyester comprising
(i) a diacid component comprising
from 70 to 100 mole % residues of terephthalic acid,
from 0 to 30 mole % residues of a modifying aromatic diacid having from 8 to 12 carbon atoms, and
from 0 to 10 mole % residues of an aliphatic dicarboxylic acid; and
(ii) a glycol component comprising
from 1 to 65 mole % cyclohexanedimethanol residues and
from 35 to 99 mole % of a modifying glycol having 2 to 20 carbon atoms;
(b) from about 5 to about 7 wt % of a polymeric flame retardant that is polysulfonyldiphenylene phenyl phosphonate,
wherein the film has a thickness of 1-10 mils and has a VTM-0 or VTM-2 rating from using polysulfonyldiphenylene phenyl phosphonate alone as the flame retardant, and wherein the film has less than about 5% haze according to ASTM D1003,
wherein the wt % is based on the weight of the copolyester composition,
wherein the total mole % of the dicarboxylic acid component is 100 mole % and the total mole % of the glycol component is 100 mole %.

* * * * *